United States Patent
Wood et al.

(10) Patent No.: US 11,659,019 B2
(45) Date of Patent: May 23, 2023

(54) RESOURCE MAPPING DURING UNIVERSAL RESOURCE LOCATOR CHANGES IN DISTRIBUTED COMPUTING SYSTEMS

(71) Applicant: MICROSOFT TECHNOLOGY LICENSING, LLC, Redmond, WA (US)

(72) Inventors: Adriana Wood, Redmond, WA (US); Min Gao, Sammamish, WA (US); Yanxia Xu, Suzhou-SIP (CN); Feng Zhang, Suzhou-SIP (CN); Andrei-Dumitru Blotu, Suzhou-SIP (CN); Hanwen Wang, Bothell, WA (US); Hongzhou Ma, Redmond, WA (US); Seshadri Mani, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 279 days.

(21) Appl. No.: 16/699,695

(22) Filed: Dec. 1, 2019

(65) Prior Publication Data
US 2021/0168191 A1 Jun. 3, 2021

(51) Int. Cl.
*H04L 67/02* (2022.01)
*G06F 16/953* (2019.01)
(Continued)

(52) U.S. Cl.
CPC ............ *H04L 67/02* (2013.01); *G06F 16/245* (2019.01); *G06F 16/951* (2019.01);
(Continued)

(58) Field of Classification Search
CPC ......... H04L 29/12594; H04L 29/12811; H04L 29/12066; H04L 45/745; H04L 61/30;
(Continued)

(56) References Cited

U.S. PATENT DOCUMENTS 7,080,158 B1 * 7/2006 Squire ................ H04L 67/2842
709/245
7,392,303 B2 6/2008 Smith et al.
(Continued)

OTHER PUBLICATIONS

"Map a URL redirect", Retrieved from: https://doc.sitecore.com/users/sxa/17/sitecore-experience-accelerator/en/map-a-url-redirect.html. Retrieved Date: Aug. 14, 2019, 3 Pages.
(Continued)

*Primary Examiner* — Barbara B Anyan
(74) *Attorney, Agent, or Firm* — Newport IP, LLC; Jacob P. Rohwer

(57) ABSTRACT

Technologies are disclosed for resource mapping during URL changes in multi-tenant distributed computing systems. The distributed computing system may resolve a URL by using a tenant and/or site name extracted from the URL to retrieve an entry in a site map table. The entry includes an address to a database that contains the requested content. After a tenant or site name has been changed, or if the tenant or site have been moved, the distributed computing system will resolve pre-existing URLs to the old entry, resulting in a file not found error. In some embodiments, during an operation that changes a tenant or site name, a redirect URL containing the new tenant and/or site name is added to the old entry. When a request addressed to a URL containing the old tenant and/or site names is received, the distributed system sends a redirect response that includes the redirect URL.

17 Claims, 12 Drawing Sheets

(51) Int. Cl.

| | |
|---|---|
| *H04L 65/403* | (2022.01) |
| *H04L 67/10* | (2022.01) |
| *G06F 16/955* | (2019.01) |
| *H04L 67/60* | (2022.01) |
| *G06F 16/245* | (2019.01) |
| *H04L 67/104* | (2022.01) |
| *G06F 16/951* | (2019.01) |

(52) U.S. Cl.
CPC ........ *G06F 16/953* (2019.01); *G06F 16/9566* (2019.01); *H04L 65/403* (2013.01); *H04L 67/10* (2013.01); *H04L 67/104* (2013.01); *H04L 67/60* (2022.05)

(58) Field of Classification Search
CPC ............. H04L 61/6009; G06F 12/1483; G06F 12/6218
See application file for complete search history.

(56) References Cited

U.S. PATENT DOCUMENTS

| | | | |
|---|---|---|---|
| 7,519,679 B2 | 4/2009 | Kale et al. | |
| 7,565,450 B2* | 7/2009 | Garcia-Luna-Aceves | ................... H04L 29/06 709/219 |
| 7,647,424 B2* | 1/2010 | Kim | ................... H04L 67/2842 709/239 |
| 8,825,856 B1* | 9/2014 | Breau | ................. G06F 16/9566 709/226 |
| 8,898,137 B1 | 11/2014 | Brundage et al. | |
| 9,276,929 B2* | 3/2016 | Williams | ................. H04L 63/10 |
| 9,634,994 B2 | 4/2017 | Prince et al. | |
| 9,742,661 B2 | 8/2017 | Klais | |
| 9,946,791 B1* | 4/2018 | Herf | .................... G06F 16/7847 |
| 10,089,489 B2* | 10/2018 | Goldfarb | ................ G06F 16/245 |
| 10,277,554 B2* | 4/2019 | Townsend | ............... H04L 61/50 |
| 10,462,539 B2* | 10/2019 | Gavade | ............. H04N 21/8352 |
| 10,841,393 B2* | 11/2020 | Chauhan | ............... H04L 67/104 |
| 10,992,568 B2* | 4/2021 | Michael | ................. H04L 45/24 |
| 11,095,780 B2* | 8/2021 | Ando | ................. H04N 1/00228 |
| 2006/0288119 A1* | 12/2006 | Kim | ..................... H04L 67/563 709/238 |
| 2010/0131588 A1 | 5/2010 | Loftus | |
| 2011/0071997 A1* | 3/2011 | Sullivan | .............. G06F 16/9566 707/706 |
| 2011/0225125 A1* | 9/2011 | Colgrave | ............ G06F 16/9566 707/689 |
| 2013/0346472 A1* | 12/2013 | Wheeldon | ............... H04L 67/02 709/203 |
| 2015/0100563 A1* | 4/2015 | Ellis | ....................... G06F 16/951 707/711 |
| 2019/0058900 A1* | 2/2019 | Ramaley | ................. H04L 67/02 |
| 2020/0367127 A1* | 11/2020 | Zhou | .................... H04W 80/06 |

OTHER PUBLICATIONS

"Move a site with URL changes", Retrieved from: https://web.archive.org/web/20160509162758/https:/support google.com/webmasters/answer/6033086. May 9, 2016, 3 Pages.

"URL Redirects", Retrieved from: https://documentation.b2c.commercecloud.salesforce.com/DOC4/topic/com.demandware.dochelp/SearchEngineOptimization/URLredirects.html?cp=0_3_9_8, Retrieved Date: Aug. 14, 2019, 2 Pages.

Lalonde, Neil, "Redirecting old forum URLs to new Discourse URLs", Retrieved from: https://meta.discourse.org/t/Yedirecting-old-forum-urls-to-new-discourse-urls/20930, Oct. 9, 2014, 6 Pages.

* cited by examiner

400

SITE MAP TABLE 110A

| SITENAME 402 | DATABASEID 404 | URLPATH 406 | URLREDIRECTPATH 408 |
|---|---|---|---|
| HUMANRESOURCES | DB4249 | NEGACORP.COLLABORATIONSERVER.COM/TEAMS/HUMANRESOURCES | NULL |
| SALES | DB4250 | NEGACORP.COLLABORATIONSERVER.COM/TEAMS/SALES | NULL |
| RESEARCH | DB4252 | NEGACORP.COLLABORATIONSERVER.COM/TEAMS/RESEARCH | NULL |
| ... | | | |

SITE MAP TABLE ENTRY 410 — points to HUMANRESOURCES row

FIG. 4A

SITE MAP TABLE 110A

| SITENAME 402 | DATABASEID 404 | URLPATH 406 | URLREDIRECTPATH 408 |
|---|---|---|---|
| HUMANRESOURCES | DB4249 | NEGACORP.COLLABORATIONSERVER.COM/TEAMS/HUMANRESOURCES | NEGACORP.COLLABORATIONSERVER.COM/TEAMS/HRWEB |
| SALES | DB4250 | NEGACORP.COLLABORATIONSERVER.COM/TEAMS/SALES | NULL |
| RESEARCH | DB4252 | NEGACORP.COLLABORATIONSERVER.COM/TEAMS/RESEARCH | NULL |
| HRWEB | DB4249 | NEGACORP.COLLABORATIONSERVER.COM/TEAMS/HRWEB | NULL |

SITE MAP TABLE 110A

| SITENAME 402 | DATABASEID 404 | URLPATH 406 | URLREDIRECTPATH 408 |
|---|---|---|---|
| HUMANRESOURCES | DB4249 | NEGACORP.COLLABORATIONSERVER.COM/TEAMS/HUMANRESOURCES | OMNICORP.COLLABORATIONSERVER.COM/TEAMS/HRWEB |
| SALES | DB4250 | OMNICORP.COLLABORATIONSERVER.COM/TEAMS/SALES | NULL |
| RESEARCH | DB4252 | OMNICORP.COLLABORATIONSERVER.COM/TEAMS/RESEARCH | NULL |
| HRWEB | DB4249 | OMNICORP.COLLABORATIONSERVER.COM/TEAMS/HRWEB | NULL |

SITE MAP TABLE 110A

| SITENAME 402 | DATABASEID 404 | URLPATH 406 | URLREDIRECTPATH 408 |
|---|---|---|---|
| HUMANRESOURCES | DB4249 | OMNICORP.COLLABORATIONSERVER.COM/TEAMS/HUMANRESOURCES | OMNICORP.COLLABORATIONSERVER.COM/TEAMS/HRWEB |
| SALES | DB4250 | OMNICORP.COLLABORATIONSERVER.COM/TEAMS/SALES | NULL |
| RESEARCH | DB4252 | OMNICORP.COLLABORATIONSERVER.COM/TEAMS/RESEARCH | OMNICORP.EU.COLLABORATIONSERVER.COM/TEAMS/RESEARCH |
| HRWEB | DB4249 | OMNICORP.COLLABORATIONSERVER.COM/TEAMS/HRWEB | NULL |
| ... | | | |

FIG. 4D

SITE MAP TABLE 110B

| SITENAME 502 | DATABASEID 504 | URLPATH 506 | URLREDIRECTPATH 508 |
|---|---|---|---|
| AQUISITIONS | DB-EU1385 | OMNICORP.EU.COLLABORATIONSERVER.COM/TEAMS/AQUISITIONS | NULL |
| PARTNERS | DB-EU4891 | OMNICORP.EU.COLLABORATIONSERVER.COM/TEAMS/PARTNERS | NULL |
| RESEARCH | DB-EU5928 | OMNICORP.EU.COLLABORATIONSERVER.COM/TEAMS/RESEARCH | NULL |

RESOURCE MAPPING DURING UNIVERSAL RESOURCE LOCATOR CHANGES IN DISTRIBUTED COMPUTING SYSTEMS

BACKGROUND

Reliability is an ongoing technological challenge for distributed computing systems. A distributed computing system is an application or service that runs on multiple networked computing devices, e.g. multiple compute nodes hosted in a server farm. Some distributed computing systems are multi-tenant in that each deployment serves multiple customers. A tenant may refer to a corporate, government, or non-profit entity, or any other collection of individuals that use a multi-tenant distributed system.

Multi-tenant deployments have several advantages compared to single tenant deployments. While single tenant deployments are typically over-provisioned to account for infrequent periods of large demand—capacity that is otherwise wasted—multi-tenant deployments share resources across tenants, increasing resource utilization efficiency. Multi-tenant deployments also share administrative overhead and electricity costs, further reducing the per-tenant cost to operate the service.

However, managing tenants of a distributed system creates challenges, such as maintaining seamless access to tenant resources while the tenant is moved, renamed, or otherwise modified. For example, a tenant running in a first server farm may be relocated to a second server farm. After the move, requests addressed to a Uniform Resource Locator (URL) to a resource in the first server farm may return an error code.

Similarly, each tenant may have multiple constituent parts, each of which may be moved, renamed, etc. For example, a distributed collaboration system such as Microsoft SharePoint™ may host multiple sites for a single tenant. Each constituent part may be moved, renamed, etc., after which requests to existing URLs may return an error code.

It is with respect to these and other technical challenges that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

Technologies are disclosed for resource mapping during URL changes in distributed computing systems. As described in greater detail below, the technologies disclosed herein can be utilized to re-direct client requests that were addressed to an outdated or otherwise invalid URL. Redirecting requests addressed to an invalid URL to the correct URL may provide the requesting user with a functional, up-to-date resource instead of returning a "file not found" error. Other technical benefits can also be realized through implementations of the disclosed technologies.

In some configurations, the distributed computing system performs a site or tenant-level operation that invalidates a URL. Example operations include renaming the site, renaming the tenant, moving the site to a different tenant, moving the tenant to a different server farm, etc. In some configurations, these operations invalidate a URL by changing a tenant or site name included in the URL. With this change, the distributed computing system can no longer resolve the URL to a database associated with the site.

For example, the URL "negacorp.collaborationserver.com/teams/humanresources/home" points to a "home" website in the "humanresources" site of the "negacorp" tenant. A site-level operation may change the site name from "humanresources" to "HRWeb". After this change, attempts by the distributed computing system to resolve the URL will fail, as there is no longer an association between the site name "humanresources" and a database that contains the "home" resource. As a result, the user who requested the "home" website will receive an error message, with no indication of how to resolve the issue.

In some configurations, the distributed computing system maintains a site map table that associates sites with databases. The distributed computing system may process a URL by extracting the site name from the URL and retrieving a corresponding entry in the site map table. An address to the associated database may be obtained from the retrieved entry. The distributed computing system uses the address of the database to obtain a requested resource.

During an operation that invalidates a URL, the distributed computing system may add a redirect URL to the existing entry in the site map table. The redirect URL may point to a new location of a requested resource, e.g. a URL that includes the new site name. Subsequent requests addressed to a stale URL may be processed by extracting the stale site name and retrieving the redirect URL from the existing entry in the site map table. The redirect URL may be included in a redirect response to the request, e.g. a hyper text transfer language (HTTP) 308 response. In this way, the device that sent the request addressed to the stale URL is alerted to the new URL.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A is a block diagram illustrating a site map table.

FIG. 4B is a block diagram illustrating the site map table after a site rename operation.

FIG. 4C is a block diagram illustrating the site map table after a tenant rename operation.

FIG. 4D is a block diagram illustrating the site map table after a site move operation.

FIG. 5 is a block diagram illustrating a site map table of a destination tenant after the site move operation.

DETAILED DESCRIPTION

The technologies disclosed herein provide for technical improvements in the implementation of resource mapping during universal resource locator changes in distributed computing systems. As described briefly above, the distributed computing system may resolve a URL included in a request from a client by using a tenant and/or site name extracted from the URL to retrieve an entry in a site map table. The entry includes an address to a database that contains content requested with the URL. After a tenant or site name has been changed, or if the tenant or site have been moved, the distributed computing system will resolve pre-existing URLs to the old site map table entry, resulting in a file not found error.

To address this technological challenge, and potentially others, during an operation that changes a tenant or site name, a redirect URL containing the new tenant and/or site name is added to the old site map table entry. When a request addressed to a URL containing the old tenant and/or site names is received, the distributed system sends a redirect response that includes the redirect URL. This technique increases reliability: instead of sending a "file not found" response, the distributed computing system enables the requesting client device to locate the requested resource.

This technique also improves the performance of the distributed computing system by handling all redirect operations with a single entry in the site map table. This is in contrast to techniques that map every individual resource to a corresponding redirect URL. Performance of the distributed computing system is also improved by reducing the number of times a redirect is processed. Specifically, by alerting the client device to the new URL, the client device is able to make subsequent requests for the resource directly to the new URL. This avoids the cost of performing a redirect operation for each subsequent request. The disclosed technologies may also provide other technical benefits other than those described herein. Additional details regarding these aspects and others will be provided below with regard to the several FIGS.

Figure 1:
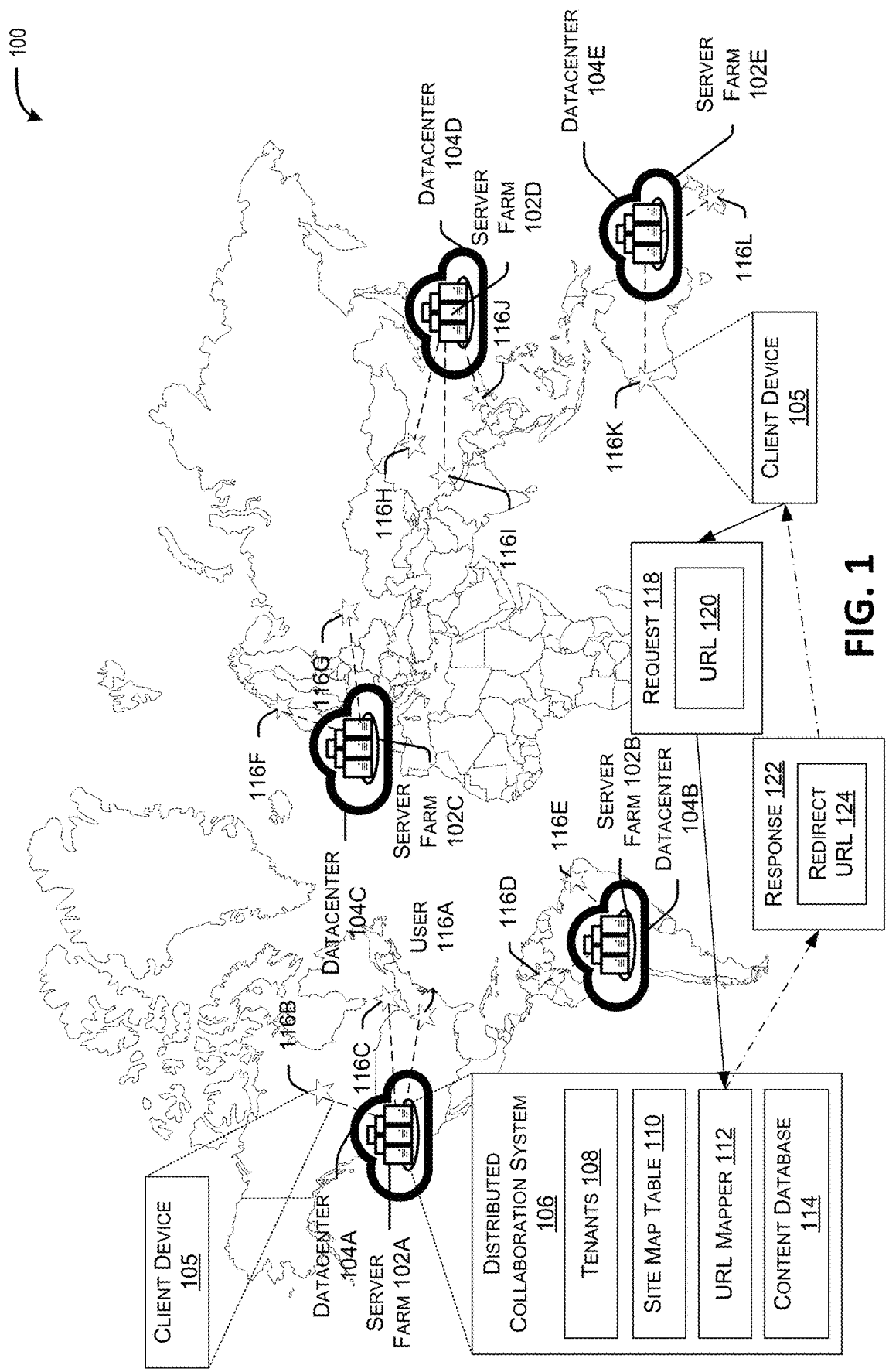
FIG. 1 is a block diagram illustrating a distributed collaboration system containing site and tenant map tables, as disclosed herein.

FIG. 1 is a block diagram 100 illustrating a distributed collaboration system 106 containing site map table 110, URL mapper component 112, and content database 114. Distributed collaboration system 106 is depicted as executing on server farm 102A, which is located within datacenter 104A. Distributed collaboration system 106 may also be associated with one or more tenants 108.

FIG. 1 illustrates multiple datacenters 104 hosting multiple server farms 102 around the world. Distributed collaboration system 106 is depicted as deployed to server farm 104A, but distributed collaboration system 106 may interact with other deployments of distributed collaboration system 106 in other server farms 102. Distributed collaboration system 106 may be distributed in that it executes across multiple computing devices in a server farm 102, e.g. URL mapper 112 may be executed on a different computing device than content database 114 or the computing device that stores site map table 110.

FIG. 1 also illustrates users 116, each of which may be associated with one of tenants 108. In some configurations, user 116B interacts with client device 105 to access distributed collaboration system 106. For example, user 116B may use client device 105 to navigate to a web page hosted by distributed collaboration system 106. To request the web page, client device 105 may send request 118 to URL mapper 114 of distributed collaboration system 106. Request 118 may include URL 120. URL 120 may include, in some form or another, the tenant name, site name, and a resource identifier (e.g. a file name of the requested web page).

While resolving the request for the web page, distributed collaboration system 106 may extract the tenant name, site name, and resource identifier from URL 120. The extracted tenant and/or site names may be used to locate content database 116. For example, the tenant and/or site names may be used to retrieve an entry in site map table 110 that contains the address of content database 116. If URL 120 is valid, meaning that the tenant name and site name reflect the current tenant an site names, distributed collaboration system 106 will retrieve the requested content from content database 116. Web pages are but one example of a resource hosted by a site in a multi-tenant distributed collaboration system 106 that may be requested by client device 105. Other resources include service endpoints, e.g. web service endpoints, downloadable files, and any other resource addressable by a URL.

However, if URL 120 is stale or otherwise invalid, e.g. if the tenant name or site name included in URL 120 are no longer valid, then URL mapper 114 may retrieve redirect URL 124 from the entry of the site map table. In some configurations, URL mapper 114 determines that the tenant name and/or site name are invalid because there is a redirect URL 124 in the corresponding entry of the site map table. When redirect URL 124 exists for the tenant name and site name containing in URL 120, URL mapper 114 of distributed collaboration system 106 may use redirect URL 124 as a base, adding to it the resource identifier extracted from URL 120. URL mapper 114 may then return response 122 containing redirect URL 124 as modified to include the resource identifier extracted from URL 120. Response 122 may be an HTTP 308 "permanent redirect" response.

In some configurations, distributed collaboration system 106 is used to share documents and files, host web sites, and enable document retention, information security, and other process requirements of the organization deploying it. Examples of distributed collaboration systems include Microsoft SharePoint™, Google Drive™ Atlassian Confluence™, Box for Business™, and Drupal™. However, other types of distributed computing systems are similarly contemplated, including email servers, web servers, application servers, or any other type of multi-tenant application. Accordingly, the term 'distributed collaboration system' as used herein encompasses these distributed computing systems and potentially others.

Figure 2:
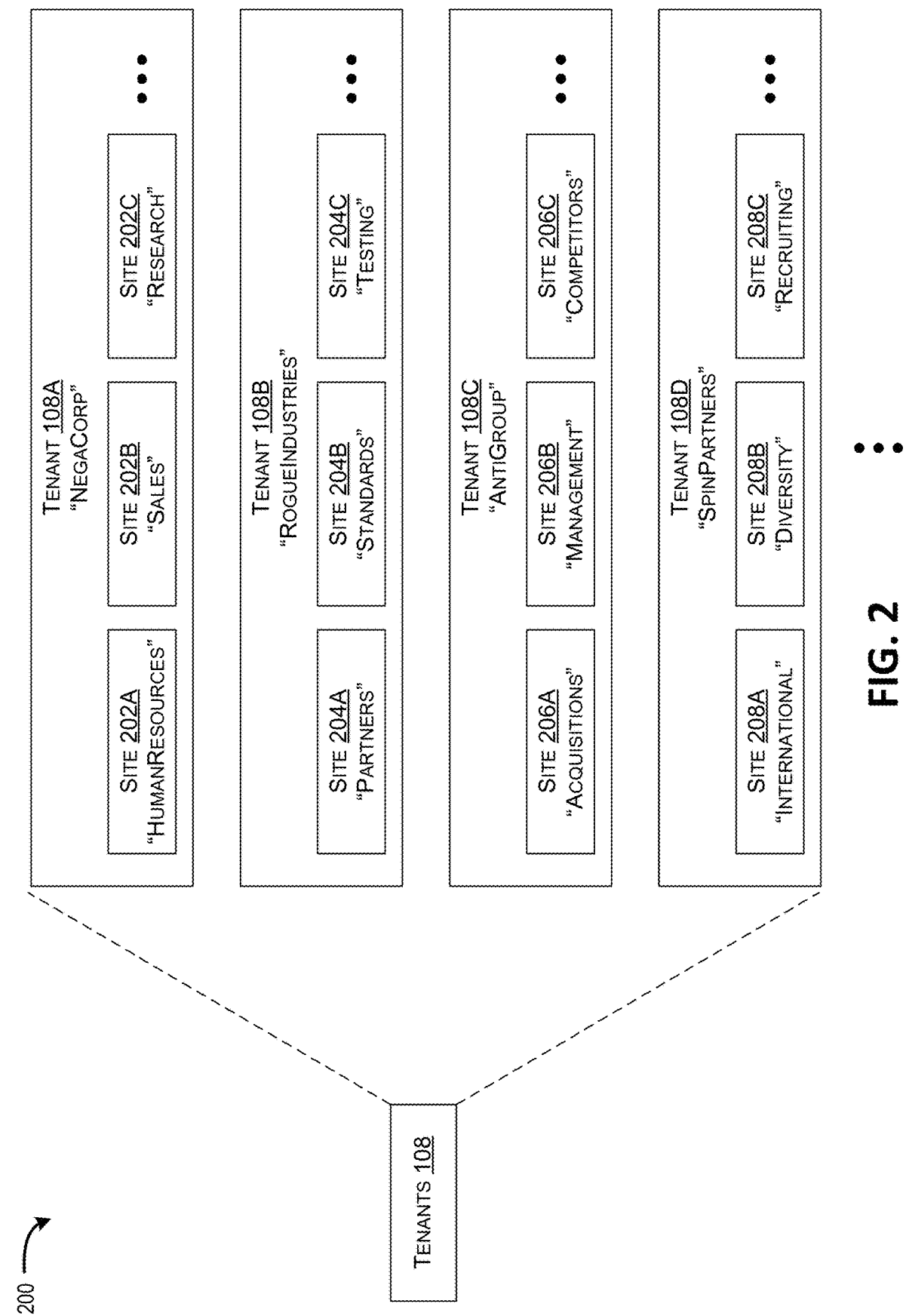
FIG. 2 is a block diagram illustrating an example list of tenants associated with the distributed collaboration system.

FIG. 2 is a block diagram 200 illustrating an example list of tenants 108 associated with distributed collaboration system 106. In some configurations, each tenant 108A-108D represents a different entity that uses distributed collaboration system 106, e.g. "NegaCorp", "PosiIndustries", "Anti-Group", and "SpinPartners". While four tenants are listed, this is for illustrative purposes only—hundreds of thousands or millions of tenants may be supported by a single deployment of distributed collaboration system 106.

In some configurations, distributed collaboration systems allow a tenant 108 to establish multiple sites 202. Each site 202 may represent a self-contained unit of functionality usable by a team within the tenant's organization. For example, "NegaCorp" has sites 202A, "HumanResources", site 202B, "Sales", and site 202C, "Research". Each site 202 may operate independently of the others. For example, documents, files, lists, websites, and other items stored for the "HumanResources" site 202A may be stored separately, logically or physically, from documents, files, lists, websites, and other resources made available by the "Sales" site 202B.

In some embodiments, each site 202 stores resources in a site-specific content database 114. A request for a resource may include a URL that includes the name of the site. In some configurations, distributed collaboration system 106 resolves the URL by extracting the tenant and/or site name from the URL, retrieving an entry associated with the extracted site name from site map table 110, and retrieving an address to the site's content database 114 from the site's entry in site map table 110. The distributed collaboration system 106 may then retrieve the requested resource from the site's content database 114.

Figure 3A:
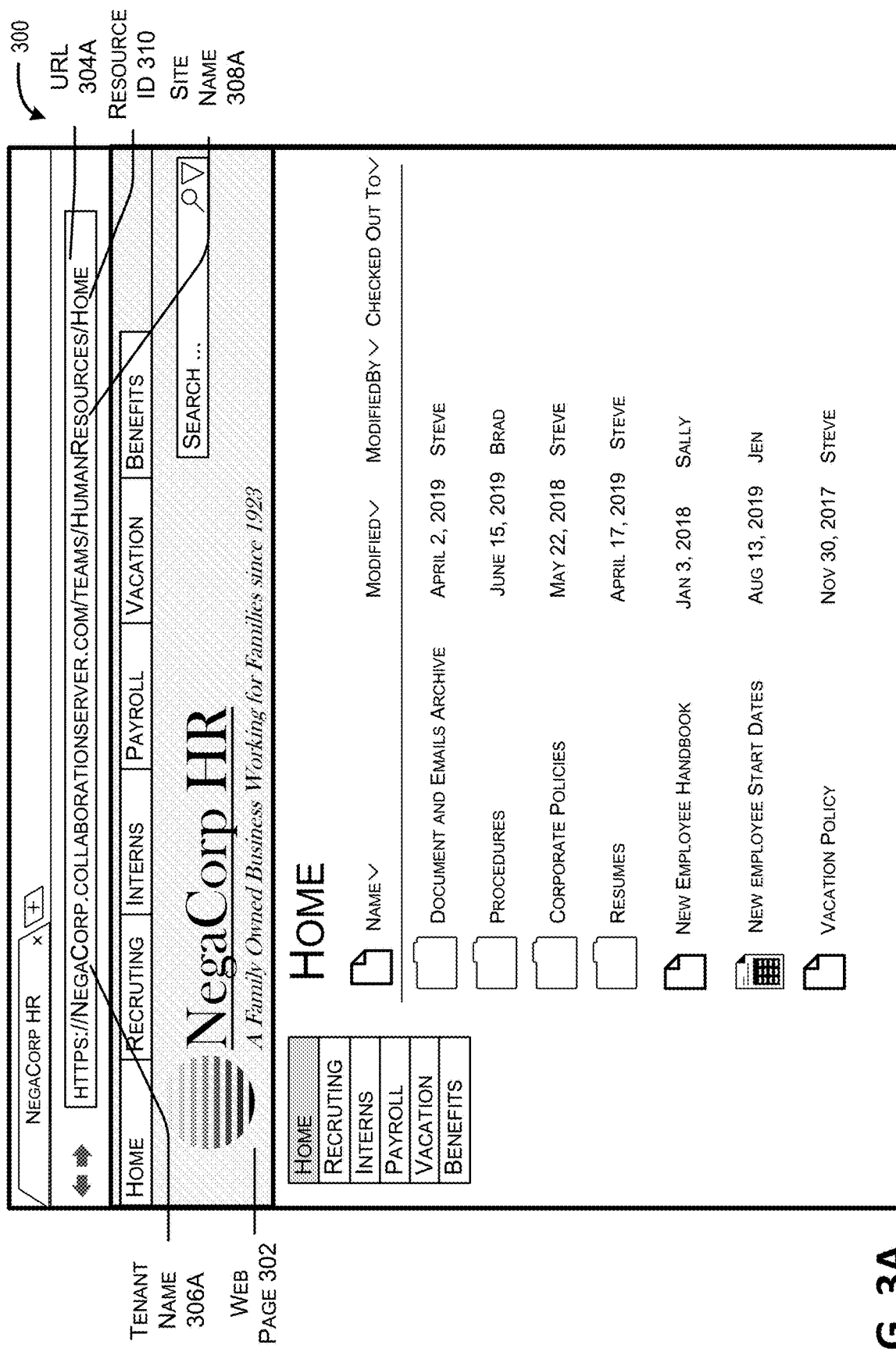
FIG. 3A is an illustration of a web page hosted by a site of one the tenants of the distributed collaboration system.

FIG. 3A is an illustration 300 of a web page 302 hosted by site 202A of tenant 108A of the distributed collaboration system 106. URL 304A is an example of a URL that a user 116 may employ to navigate to a web page 302 of site 202A associated with tenant 108A. In this example, URL 304A includes the site name 308A, "HumanResources", the tenant name 306A, "NegaCorp", and resource ID 310, "home." Resource ID 310 refers to the web page, file, web service, or other resource that is being requested, while the combination of tenant name 306A and site name 308A are used to determine which site to look for the requested resource in.

Figure 3B:
FIG. 3B is an illustration of the web page hosted by the site of one the tenants of the distributed collaboration system after one or more site or tenant level operations have invalidated URLs to the web page.

FIG. 3B is an illustration 300 of the web page 302 hosted by site 202A of tenant 108A of distributed collaboration system 106 after one or more site or tenant level operations have invalidated URL 304A. Specifically, one or more tenant or site level operations may have caused tenant name 306A, "NegaCorp", to be renamed to tenant name 306B, "OmniCorp", while site name 308A, "humanresources", has been renamed to site name 308B, "HRWeb". While FIG. 3B depicts URL 304B after both tenant name 306A and site name 308A have changed, it is similarly contemplated that tenant name alone or site name alone can be changed.

In some configurations, a tenant-level operation is an operation that affects a tenant without affecting sites contained by the tenant. Examples include a tenant rename operation and a tenant move operation. A tenant rename operation may leave a tenant in place in the distributed collaboration application it currently resides in, but changes the tenant's name. A tenant rename operation may be implemented by updating the tenant's entry in the distributed collaboration application's tenants table, as well as updating entries in the distributed collaboration application's site map table for each site associated with the tenant.

A tenant move operation may move a tenant from a source distributed collaboration application to a destination distributed collaboration application. The source and destination distributed collaboration applications may be hosted on different server farms. A tenant move operation may be implemented in part by making the tenant and all associated sites read-only. While they are read-only, the source distributed collaboration system may copy the tenant and associated sites to the destination distributed collaboration application. In another embodiment, the read-only tenant is restored by the destination distributed collaboration application.

In some configurations, a site-level operation affects a site, without affecting the tenant it is associated with. For example, a site-level operation may rename a site or move a site to a different tenant.

URLs 304A and 304B represent one way in which tenant names 306 and site names 308 may be included in a URL. Specifically, tenant name 306 is included as a subdomain, e.g. as "OmniCorp" in the domain name "omnicorp.collaborationserver.com", while site name 308 is included as part of the directory path of the URL. However, other techniques for encoding values in a URL are similarly contemplated, such as a query parameter. Furthermore, either name could be included in any part of the URL. For example, the tenant name may also be included in the URL as part of the directory path, e.g. as "collaborationserver.com/omnicorp/teams/hrweb/home."

FIG. 4A is a block diagram 400 illustrating a site map table 110A. Site map table 110A may include a SiteName column 402, a DatabaseID column 404, a UrlPath column 406, and a novel UrlRedirectPath column 408. Site map table 110A of FIG. 4A depicts entries for site 202A, human resources, site 202B, sales, and site 202C, research. For example, site map table entry 410 is an entry for the site named "HumanResources", which is part of the tenant named "NegaCorp".

SiteName column 402 stores the name of the site. During a rename operation, this value may be changed. DatabaseID column 404 stores an identifier or other address to a database that stores content associated with the site. For example, the human resources site 202A stores content in 'DB4249'. In some configurations, DatabaseID 404 may include a fully qualified domain name to the database. URLPath column 406 stores a URL usable to navigate to the site. For example, URLPath 406 of the human resources site 202A is "NegaCorp.collaborationserver.com/teams/humanresources."

In some configurations, site map table 110A includes URLRedirectPath column 408. The values in this column are "Null" in FIG. 4A, as no tenant or site-level operations that necessitate redirection have occurred.

The columns illustrated in site map table 110A are non-limiting. Additional columns may also be included, and some of the illustrated columns may be included in different tables. For example, site map table 110A may include a SiteID column that stores a unique identifier associated each site. A SiteID may be any unique identifier, e.g. a globally unique identifier (GUID). A SiteID may be used when querying site map table 110A to retrieve a row associated with the corresponding site 202. In this way, SiteID is an alternative to querying site map table 110A based on site name.

Some of the columns illustrated in FIG. 4A may be split out into separate tables. For example, the URLRedirectPath column 408 may be stored in a 'Redirect' table. The 'Redirect' table may also include a SiteID, SiteName, or other column that uniquely identifies a site. In some configurations, a foreign key relationship based on the column that uniquely identifies a site may be used to associate entries in site map table 110A with corresponding entries in the 'Redirect' table.

In some configurations, queries to site map table 110A may include a join operation that retrieves the URLRedirectPath column 408 from the 'Redirect' table. In other configurations, URL mapper 114 may query site map table 110A first, and then query the 'Redirect' table for a redirect URL if it determines that an operation has invalidated the requested URL.

In configurations where URLRedirectPath column 408 is included in a separate 'Redirect' table, URL mapper 114 may update site map table 110A after an operation that necessitated the URL redirect completes. For example, URL mapper 114 may change the value of URLPath 406 to include the path stored in URLRedirectPath column 408. Site map table 110A may include a Boolean column indicating that the operation that necessitated the URL redirect is complete, and that the value stored in URLPath 406 is now the redirect URL. In another embodiment, the DatabaseID column 404 is updated to store an invalid value, e.g. NULL, indicating that the value stored in URLPath 406 is now a redirect URL.

FIG. 4B is a block diagram 400 illustrating site map table 110A after a site rename operation has occurred. As discussed above in conjunction with FIGS. 3A and 3B, the "HumanResources" site 202A has been renamed to "HRWeb". According to an aspect of the embodiments, the site rename operation adds a new row with the new site name "HRWeb" to site map table 110A. The URLPath of the new row reflects the new site name: "negacorp.collaborationserver.com/teams/HRWeb". Since only the name has changed, and not the content, the database address listed in DatabaseID column 404 of the new row is the same: "DB4249."

At the same time, the original entry for the site, "HumanResources", has a value added to the URLRedirectPath column 408: "negacorp.collaborationserver.com/teams/HRWeb." The existence of this redirect path tells distributed collaboration application 106 that "HumanResources" is no longer the correct site name. In this way, distributed collaboration application 106 will know to perform a redirect operation in response to a request addressed to a URL that still contains the site name "HumanResources". For example, distributed collaboration application 106 may send an HTTP 308 response, i.e. a permanent redirect, containing the redirect URL. By sending an HTTP 308 response, the distributed collaboration application 106 provides the requesting client with the updated URL, and indirectly, the updated site name. This enables the requesting client to perform subsequent requests for the resource with a URL that contains the new site name. Performing requests for the resource with a URL that contains the new site name increases the efficiency of the distributed collaboration application 106 by avoiding the computational cost of repeatedly retrieving an outdated entry from the site map table and sending an HTTP 308 response. The requesting client may also recognize that a site name change has occurred, and will update all subsequent requests to include the new site name.

FIG. 4C is a block diagram 400 illustrating site map table 110A after a tenant rename operation. In some configurations, tenant-level operations such as tenant rename do not affect sites within the tenant. As such, the SiteName column 402 and the DatabaseID column 404 remain unchanged. In other embodiments, e.g. a tenant move, site names remain unchanged, but site resources may be migrated to a new database, and so entries in the DatabaseID 404 column may be updated accordingly.

As depicted in FIG. 4C, when a tenant is renamed, every valid entry in the URLPath column 406 may be updated to reflect the new name. For example, the URLPath "negacorp.collaborationserver.com/teams/HRWeb" may be updated to "omnicorp.collaborationserver.com/teams/HRWeb." In some configurations, valid URLPaths are entries in which the URLPath actually points to the site—i.e. there has not been a tenant or site-level operation that has moved, renamed, or otherwise made the site inaccessible from the URLPath. In contrast, invalid URLPaths do not point to an actual site, but are retained for the purpose redirecting outdated URLs. Invalid URLPaths may be identified by the existence of a URLRedirectPath in the same row. In some configurations, invalid URLPaths remain unchanged during a tenant-level operation.

FIG. 4C also depicts that entries in the URLRedirectPath column 408 may be updated. In this way, redirect responses sent to requesting clients include the updated tenant name.

FIG. 4D is a block diagram 400 illustrating site map table 110A after a site move operation. As depicted, the site named "research" has been moved to another tenant named "omnicorp.EU." This means that the "research" site, including the contents of the database with identifier DB4252, have been moved to a different tenant, and potentially to a different server farm. Distributed collaboration application 106 will detect this move when processing a URL addressed to the "research" site of the "omnicorp" tenant by the existence of the redirect path "omnicorp.eu.collaborationserver.com/teams/research." In some configurations, the redirect path "omnicorp.eu.collabirationserver.com/teams/research" is added to an HTTP 308 redirect response as discussed above.

FIG. 5 is a block diagram 500 illustrating a site map table 110B of a destination tenant after the site move operation. In some configurations, site map table 512B includes SiteName column 502, DatabaseID 504, URLPath 506, and URLRedirectPath 508 that are comparable to SiteName column 402, DatabaseID 404, URLPath 406, and URLRedirectPath 408. Site map table 110B includes an entry for the site named "research", which was moved from site map table 110A. Entries in the DatabaseID column 504 and URLPath column 506 are "DB-EU5928" and "omnicorp.eu.collaborationserver.com/teams/research", respectively.

Figure 6:
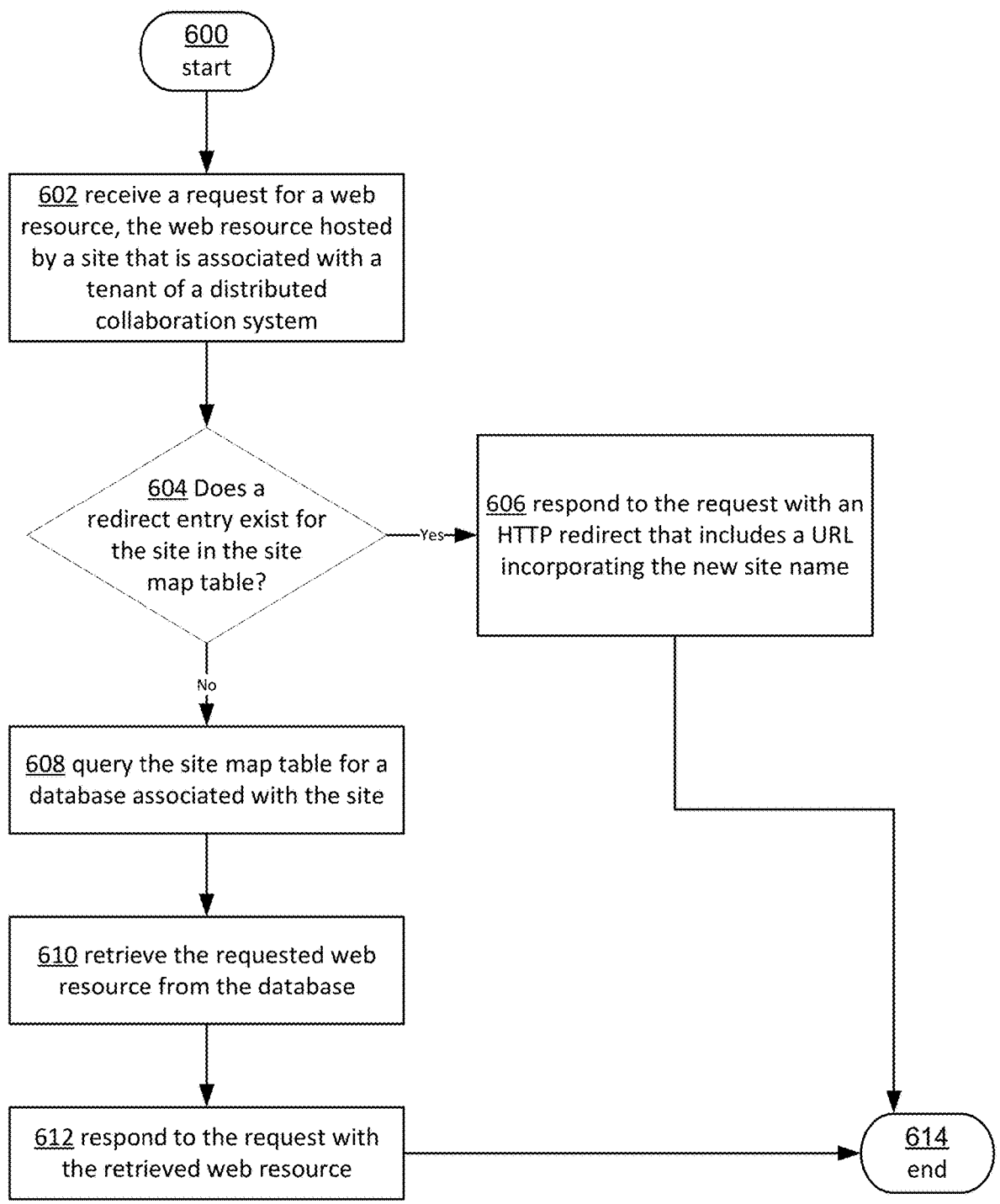
FIG. 6 is a flow diagram illustrating an example operational procedure according to the described implementations.

FIG. 6 is a flow diagram illustrating an example routine 600 performed by distributed collaboration system 106 for resource mapping during URL changes. Referring to FIG. 6, operation 600 begins the procedure.

From operation 600, the routine 600 proceeds to operation 602, where distributed collaboration server 106 receives a request for a web addressable resource from a client device 105. In some embodiments, the request is for a resource hosted by a site 202 that is associated with a tenant 108 of distributed collaboration system 106. Responsive to the receipt of the request, the routine 600 proceeds from operation 602 to operation 604. At operation 604, URL mapper 112 determines if a redirect entry exists for site 202 in site map table 110.

Responsive to a redirect entry not existing for site 202 in site map table 110, the routine 600 proceeds from operation 604 to operation 608, where distributed collaboration system 106 queries site map table 110 to identify a database associated with site 202. The routine 600 then proceeds from operation 608 to operation 610, where distributed collaboration server 106 retrieves the requested web resource from the database associated with site 202. The routine 600 then proceeds from operation 610 to operation 612, where distributed collaboration server 106 responds to the request from client device 105 with the retrieved web resource. The routine 600 then proceeds from operation 612 to operation 614, where it ends.

Responsive to a redirect entry existing for site 202 in site map table 110, the routine proceeds from operation 604 to operation 606, where distributed collaboration system 106 retrieves a redirect URL for site 202 from site map table 110. Distributed collaboration system 106 may concatenate or otherwise incorporate an identifier of the requested web resource into the retrieved redirect URL. Examples of an identifier of the requested web resource is the "home" website, the name of a file to be downloaded, and a web service function name. Distributed collaboration system 106 may then add the redirect URL with the incorporated identifier of the requested web resource to an HTTP redirect response. The routine 600 then proceeds from operation 606 to operation 614, where it ends.

Figure 7:
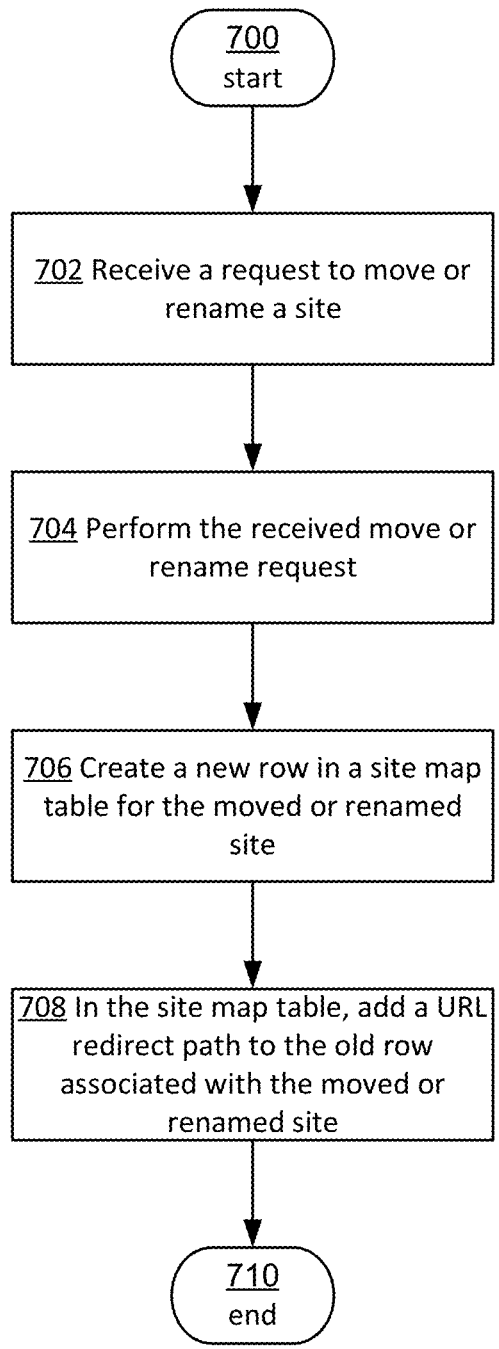
FIG. 7 is a flow diagram illustrating an example operational procedure according to the described implementations.

FIG. 7 is a flow diagram illustrating an example routine 700 performed by distributed collaboration application 106 for performing a tenant or site-level operation that necessitates a redirect. Referring to FIG. 7, operation 700 begins the procedure.

From operation 700, the routine 700 proceeds to operation 702, where distributed collaboration system 106 receives a request to move or rename a site. The routine 700 then proceeds from operation 702 to operation 704, where distributed collaboration system 106 performs the received move or rename request.

The routine 700 then proceeds from operation 704 to operation 706, where distributed collaboration system 106 creates a new row in site map table 110 for the moved or renamed site. The routine 700 then proceeds from operation 706 to operation 708, where distributed collaboration system 106 adds a URL redirect path to the old row of the site map table that is associated with the moved or renamed site. The routine 700 then proceeds from operation 708 to operation 710, where it ends.

It should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some configurations, the system components include a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Figure 8:
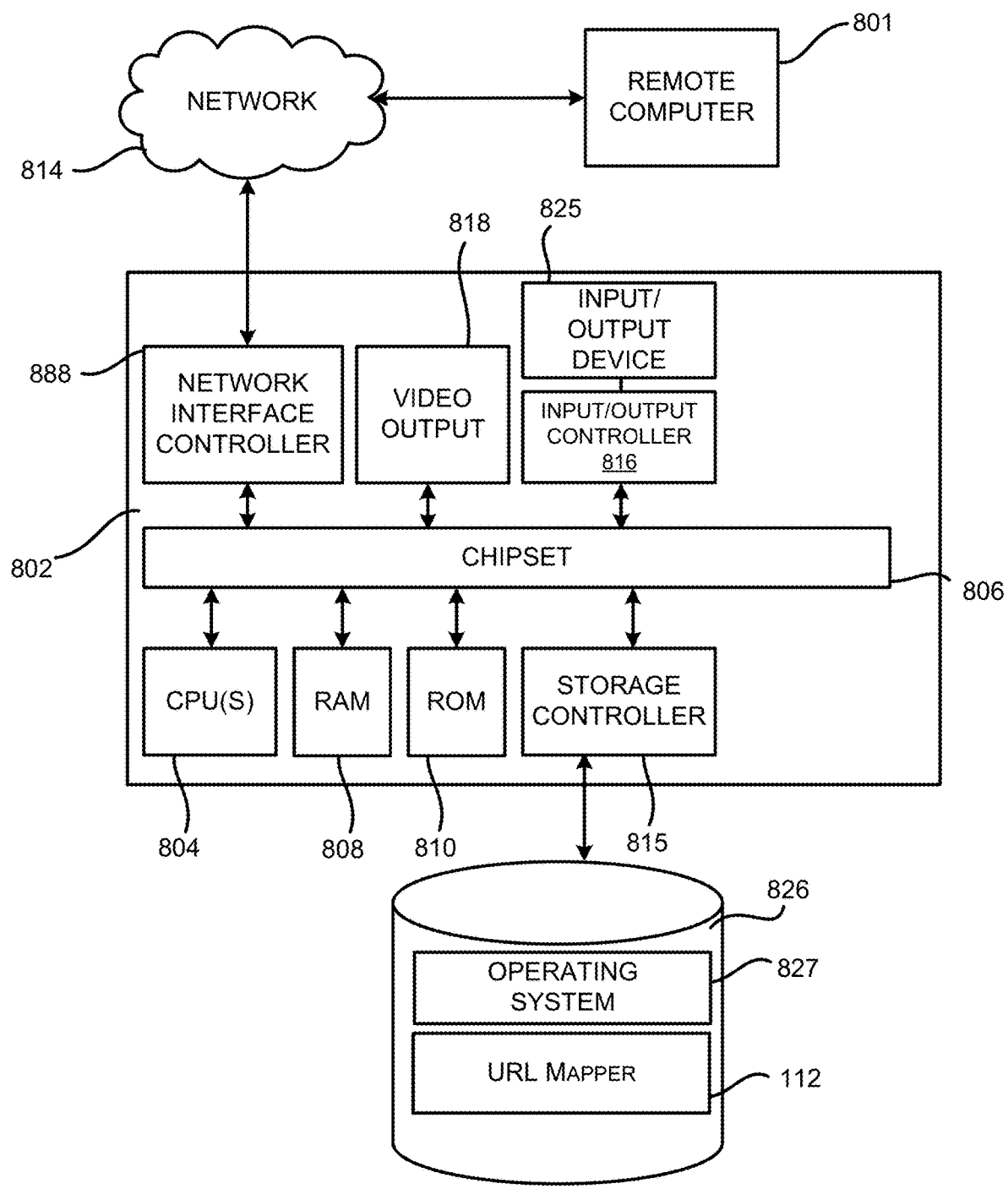
FIG. 8 is a computer architecture diagram illustrating a computing device architecture for a computing device capable of implementing aspects of the techniques and technologies presented herein.

FIG. 8 shows additional details of an example computer architecture capable of various aspects of the embodiments described above. The computer architecture shown in FIG. 8 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 8 may be utilized to execute URL mapper 114 as described above.

The computer architecture includes a baseboard 802, or "motherboard," which is a printed circuit board to which a multitude of components or devices may be connected by way of a system bus or other electrical communication paths. In one illustrative embodiment, one or more central processing units (CPUs) 804 operate in conjunction with a chipset 806. The CPUs 804 may be standard programmable processors that perform arithmetic and logical operations necessary for the operation of the computer architecture.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer architecture. The chipset 806 may further provide an interface to a computer-readable storage medium such as a read-only memory (ROM) 810 or non-volatile RAM (NVRAM) for storing basic routines that help to startup the computing device and to transfer information between the various components and devices. The ROM 810 or NVRAM may also store other software components necessary for the operation of the computer architecture in accordance with the embodiments described herein.

The computer architecture may operate in a networked environment using logical connections to remote computing devices and computer systems through a network 814, such as the local area network. The chipset 806 may include functionality for providing network connectivity through a network interface controller (NIC) 888, such as a gigabit Ethernet adapter. The NIC 888 is capable of connecting the computer architecture to other computing devices over the network 814. It should be appreciated that multiple NICs 888 may be present in the computer architecture, connecting the computer to other types of networks and remote computer systems. The network allows the computer architecture to communicate with remote services and servers, such as the remote computer 801. As can be appreciated, the remote computer 801 may be any computing device, such as a server computing device that is part of one of server farms 102.

The computer architecture may be connected to a mass storage device 826 that provides non-volatile storage for the computing device. The mass storage device 826 may store system programs, application programs, other program modules, and data, which have been described in greater detail herein. The mass storage device 826 may be connected to the computer architecture through a storage controller 815 connected to the chipset 806. The mass storage device 826 may consist of one or more physical storage units. The storage controller 815 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computer architecture may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computer architecture may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 826 by detecting the physical states or characteristics of one or more particular locations within the physical storage units.

In addition to the mass storage device 826 described above, the computer architecture may have access to other computer-readable media to store and retrieve information, such as program modules, data structures, or other data. As the operating system 827, the URL mapper 114, other data and other modules are depicted as data and software stored in the mass storage device 826, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 826 may store an operating system 827 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, or iOS operating systems, available from their respective manufacturers. It should be appreciated that other operating systems may also be utilized. The mass storage device 826 may store other system or application programs and data utilized by the computer architecture, such as any of the other software components and data described above. The mass storage device 826 might also store other programs and data not specifically identified herein.

In one embodiment, the mass storage device 826 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 804 transition between states, as described above. According to one embodiment, the computer architecture has access to computer-readable storage media storing computer-executable instructions which, when executed by the computer architecture, perform the various routines described above with regard to FIG. 8, and the other FIGS. The computing device might also include computer-readable storage media for performing any of the other computer-implemented operations described herein.

The computer architecture may also include one or more input/output controllers 816 for receiving and processing input from a number of input devices, such as a keyboard, a mouse, a microphone, a headset, a touchpad, a touch screen, an electronic stylus, image processing and gesture recognition devices, or any other type of input device. The input/output controller 816 is in communication with an input/output device 825. The input/output controller 816 may provide output to a display, such as a computer monitor, a flat-panel display, a digital projector, a printer, a plotter, or other type of output device. The input/output controller 816 may provide input communication with other devices such as a microphone, a speaker, game controllers and/or audio devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The disclosure presented herein may be considered in view of the following clauses.

Example 1: A computer-implemented method for redirecting a request, the computer-implemented method comprising: receiving the request from a computing device associated with a tenant of a multi-tenant distributed collaboration system, wherein the request includes a uniform resource locator (URL) that includes a name of a site associated with the tenant; extracting the name of the site from the URL; querying a site map table based on the name of the site to retrieve a site map table entry associated the site; determining whether the site map table entry includes a redirect URL associated with the site; in response to determining that the site map table entry includes the redirect URL: adding a resource identifier extracted from the URL to the redirect URL; and responding to the request with a response message that includes the redirect URL.

Example 2: The computer-implemented method of Example 1, wherein in response to determining that the site map table does not include a redirect URL associated with the site, the computer-implemented method further comprises: retrieving a database identifier from the site map table entry; retrieving a resource corresponding to the resource identifier from a database identified by the database identifier; and responding to the request by providing the resource.

Example 3: The computer-implemented method of Example 2, wherein the redirect URL was added to the site map table entry in response to an operation that modified the name of the site.

Example 4: The computer-implemented method of Example 2, wherein the redirect URL includes a name of the tenant, and wherein the computer-implemented method further comprises: performing a tenant-level operation that modifies the name of the tenant; and modifying the redirect URL to include the modified name of the tenant.

Example 5: The computer-implemented method of Example 1, wherein the response message includes a hypertext transfer protocol (HTTP) response message.

Example 6: The computer-implemented method of Example 1, wherein the resource includes a web site, a file, or a web service.

Example 7: The computer-implemented method of Example 1, wherein the site map table entry includes the redirect URL in response to a tenant-level or site-level operation that renamed the tenant or the site or that moved the tenant or the site.

Example 8: A computer-readable storage medium having computer-executable instructions stored thereupon which, when executed by a processor, cause the processor to: receive a request from a computing device associated with a tenant of a multi-tenant distributed collaboration system, wherein the request includes a uniform resource locator (URL) that includes a name of a site associated with the tenant; extract the name of the site from the URL; query a site map table based on the name of the site to retrieve a site map table entry associated the site; determine whether the site map table entry includes a redirect URL associated with the site; in response to determining that the site map table entry includes the redirect URL: add a resource identifier extracted from the URL to the redirect URL; and respond to the request with a response message that includes the redirect URL.

Example 9: The computer-readable storage medium of Example 8, wherein in response to determining that the site map table does not include a redirect URL associated with the site, the computer-executable instructions further cause the processor to: retrieve a database identifier from the site map table entry; retrieve a resource corresponding to the resource identifier from a database identified by the database identifier; and respond to the request by providing the resource.

Example 10: The computer-readable storage medium of Example 8, wherein the redirect URL was added to the site map table entry in response to an operation that moved the site to a different tenant.

Example 11: The computer-readable storage medium of Example 8, wherein the redirect URL was added to the site map table entry in response to an operation that moved the tenant to a different server farm, and wherein the redirect URL is addressed to the different server farm.

Example 12: The computer-readable storage medium of Example 8, wherein the redirect URL comprises a first redirect URL and the site map table entry comprises a first site map table entry, wherein the first redirect URL was added to the first site map table entry in response to a first site rename operation, wherein the first site rename operation added a second entry to the site map table, and wherein the second entry includes a new name of the site.

Example 13: The computer-readable storage medium of Example 12, wherein a second site rename operation: creates a third entry in the site map table; adds a second redirect URL to the second entry, wherein the second redirect URL includes a site name associated with the third entry in the site map table; and modifies the first redirect URL to include the site name associated with the third entry in the site map table.

Example 14: The computer-readable storage medium of Example 13, wherein the computer-executable instructions further cause the processor to process a site move operation by: causing an entry to be added to a site map table associated with a tenant the site has been moved to; adding, to the third entry in the site map table, a redirect URL that points to the tenant the site has been moved; and updating the redirect URLs in the first and second entries in the site map table to point to the tenant the site has been moved to.

Example 15: A computing device, comprising: one or more processors; and at least one computer storage media having computer-executable instructions stored thereupon which, when executed by the one or more processors, will cause the computing device to: receive a request to perform an operation that changes a name of a site of a tenant of a multi-tenant distributed collaboration system from an existing name to a new name; adding an entry to a site map table that associates the new name of the site with a database that contains resources associated with the site; and adding a redirect URL to an entry in the site map table associated with the existing name of the site, wherein the redirect URL includes the new name of the site.

Example 16: The computing device of Example 15, wherein the computer-executable instructions further cause the computing device to: receive a request to perform a tenant rename operation from an existing tenant name to a new tenant name; modify the redirect URL to include the new tenant name.

Example 17: The computing device of Example 15, wherein a name of the tenant is encoded as a sub-domain of the redirect URL, and wherein the new name of the site is encoded as part of the path of the URL or a query parameter of the URL.

Example 18: The computing device of Example 15, wherein the computer-executable instructions further cause the computing device to: receive a request to perform a tenant move operation from an existing server farm to a new server farm, wherein a name of the tenant in the new server farm is qualified with an indication of a location of the new server farm; and modify the redirect URL to include the name of the tenant in the new server farm.

Example 19: The computing device of Example 15, wherein the computer-executable instructions further cause the computing device to: receive a request from a computing device associated with the tenant for a resource associated with the site; extract the old site name from a URL included in the request; query the site map table for an entry associated with the old site name; retrieve the redirect URL from the entry; add a resource identifier to the redirect URL; and respond to the request with a response message that includes the redirect URL.

Example 20: The computing device of Example 19, wherein the response message causes the computing device associated with the tenant to send subsequent requests for resources with URLs that comprise the new name of the site.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:
1. A computer-implemented method for redirecting a request, the computer-implemented method comprising:
    receiving the request from a computing device associated with a tenant of a multi-tenant distributed collaboration system, wherein the request includes a uniform resource locator (URL) that includes a name of a site associated with the tenant;
    extracting the name of the site from the URL;
    querying a site map table based on the name of the site to retrieve a site map table entry associated with the site;
    determining whether the site map table entry includes a redirect URL associated with the site, wherein:
        the redirect URL is added to the site map table entry in response to an operation that moves the tenant to a different server farm, and
        the redirect URL is addressed to the different server farm;

in response to determining that the site map table entry includes the redirect URL:
   extracting a resource identifier from the URL, wherein the resource identifier includes a part of the URL and does not include all of the URL;
   adding the resource identifier extracted from the URL to the redirect URL; and
   responding to the request with a response message that includes the redirect URL.

2. The computer-implemented method of claim 1, wherein in response to determining that the site map table does not include the redirect URL associated with the site, the computer-implemented method further comprises:
   retrieving a database identifier from the site map table entry;
   retrieving a resource corresponding to the resource identifier from a database identified by the database identifier; and
   responding to the request by providing the resource.

3. The computer-implemented method of claim 2, wherein the redirect URL is added to the site map table entry further in response to an operation that modified the name of the site.

4. The computer-implemented method of claim 2, wherein the redirect URL includes a name of the tenant, and wherein the computer-implemented method further comprises:
   performing a tenant-level operation that modifies the name of the tenant; and
   modifying the redirect URL to include the modified name of the tenant.

5. The computer-implemented method of claim 1, wherein the response message includes a hypertext transfer protocol (HTTP) response message.

6. The computer-implemented method of claim 1, wherein the resource identifier identifies a specific web site, file, or web service.

7. A computer-readable storage medium having computer-executable instructions stored thereupon which, when executed by a processor, cause the processor to:
   receive a request from a computing device associated with a tenant of a multi-tenant distributed collaboration system, wherein the request includes a uniform resource locator (URL) that includes a name of a site associated with the tenant;
   extract the name of the site from the URL;
   query a site map table based on the name of the site to retrieve a site map table entry associated with the site;
   determine whether the site map table entry includes a redirect URL associated with the site wherein:
      the redirect URL is added to the site map table entry in response to an operation that moves the tenant to a different server farm, and
      the redirect URL is addressed to the different server farm;
   in response to determining that the site map table entry includes the redirect URL:
      extract a resource identifier from the URL, wherein the resource identifier includes a part of the URL and does not include all of the URL;
      add the resource identifier extracted from the URL to the redirect URL; and
      respond to the request with a response message that includes the redirect URL.

8. The computer-readable storage medium of claim 7, wherein in response to determining that the site map table does not include the redirect URL associated with the site, the computer-executable instructions further cause the processor to:
   retrieve a database identifier from the site map table entry;
   retrieve a resource corresponding to the resource identifier from a database identified by the database identifier; and
   respond to the request by providing the resource.

9. The computer-readable storage medium of claim 7, wherein the redirect URL is added to the site map table entry further in response to an operation that moved the site to a different tenant.

10. The computer-readable storage medium of claim 7, wherein the redirect URL comprises a first redirect URL and the site map table entry comprises a first site map table entry, wherein the first redirect URL is added to the first site map table entry further in response to a first site rename operation, wherein the first site rename operation adds a second site map table entry to the site map table, and wherein the second site map table entry includes a new name of the site.

11. The computer-readable storage medium of claim 10, wherein a second site rename operation:
   creates a third site map table entry in the site map table;
   adds a second redirect URL to the second site map table entry, wherein the second redirect URL includes a site name associated with the third site map table entry in the site map table; and
   modifies the first redirect URL to include the site name associated with the third site map table entry in the site map table.

12. The computer-readable storage medium of claim 11, wherein the computer-executable instructions further cause the processor to process a site move operation by:
   causing an entry to be added to a site map table associated with a tenant to which the site has been moved;
   adding, to the third site map table entry in the site map table, a redirect URL that points to the tenant to which the site has been moved; and
   updating the redirect URLs in the first and second site map table entries in the site map table to point to the tenant to which the site has been moved.

13. A computing device, comprising:
   one or more processors; and
   at least one computer storage media having computer-executable instructions stored thereupon which, when executed by the one or more processors, will cause the computing device to:
      receive a request to perform an operation that changes a name of a site of a tenant of a multi-tenant distributed collaboration system from an existing name to a new name;
      add an entry to a site map table that associates the new name of the site with a database that contains resources associated with the site;
      add a redirect uniform resource locator (URL) to an entry in the site map table associated with the existing name of the site, wherein the redirect URL includes the new name of the site;
      receive a request to perform a tenant move operation from an existing server farm to a new server farm, wherein a name of the tenant in the new server farm is qualified with an indication of a location of the new server farm; and
      modify the redirect URL to include the name of the tenant in the new server farm.

14. The computing device of claim 13, wherein the computer-executable instructions further cause the computing device to:
- receive a request to perform a tenant rename operation from an existing tenant name to a new tenant name;
- modify the redirect URL to include the new tenant name.

15. The computing device of claim 13, wherein the name of the tenant is encoded as a sub-domain of the redirect URL, and wherein the new name of the site is encoded as part of a path of the redirect URL or a query parameter of the redirect URL.

16. The computing device of claim 13, wherein the computer-executable instructions further cause the computing device to:
- receive a request from a computing device associated with the tenant for a resource associated with the site;
- extract an old site name from a URL included in the request;
- query the site map table for an entry associated with the old site name;
- retrieve the redirect URL from the entry;
- add a resource identifier to the redirect URL; and
- respond to the request with a response message that includes the redirect URL.

17. The computing device of claim 16, wherein the response message causes the computing device associated with the tenant to send subsequent requests for resources with URLs that comprise the new name of the site.

* * * * *